United States Patent
Steffan et al.

(10) Patent No.: US 10,441,942 B2
(45) Date of Patent: Oct. 15, 2019

(54) REACTION TUBE AND METHOD FOR PRODUCING HYDROGEN CYANIDE

(71) Applicant: Evonik Degussa GmbH, Essen (DE)

(72) Inventors: Martin Steffan, Singapore (SG);
Martin Steurenthaler, Singapore (SG);
Thomas Müller, Altenstadt (DE);
Martin Körfer, Kahl (DE); Steffen Krill, Mühltal (DE)

(73) Assignee: Evonik Degussa, GmbH, Essen (DE)

( * ) Notice: Subject to any disclaimer, the term of this patent is extended or adjusted under 35 U.S.C. 154(b) by 0 days.

(21) Appl. No.: 15/028,415

(22) PCT Filed: Oct. 2, 2014

(86) PCT No.: PCT/EP2014/071119
§ 371 (c)(1),
(2) Date: Apr. 8, 2016

(87) PCT Pub. No.: WO2015/052066
PCT Pub. Date: Apr. 16, 2015

(65) Prior Publication Data
US 2016/0263558 A1    Sep. 15, 2016

(30) Foreign Application Priority Data
Oct. 11, 2013  (EP) .................... 13188304

(51) Int. Cl.
*B01J 23/42*   (2006.01)
*B01J 21/04*   (2006.01)
(Continued)

(52) U.S. Cl.
CPC ............. *B01J 23/42* (2013.01); *B01J 12/007* (2013.01); *B01J 19/006* (2013.01);
(Continued)

(58) Field of Classification Search
CPC ... C01C 3/0229; B01J 12/007; B01J 19/0026; B01J 19/2415
(Continued)

(56) References Cited

U.S. PATENT DOCUMENTS 3,156,544 A   11/1964   Eck et al.
3,970,435 A    7/1976   Schultz et al.
(Continued)

FOREIGN PATENT DOCUMENTS

AU        639926      5/1990
DE      1 078 554     3/1960
(Continued)

OTHER PUBLICATIONS

Sauer et al, "Hydrocyanic Acid (HCN) Production", Handbook of Heterogeneous Catalysis, Part 12, Inorganic Reactions, 2008, pp. 2592-2609.*

(Continued)

*Primary Examiner* — Ngoc-Yen Nguyen
(74) *Attorney, Agent, or Firm* — Law Office of: Michael A. Sanzo, LLC

(57) ABSTRACT

The reaction tube for preparing hydrogen cyanide comprises a cylindrical tube composed of ceramic, a catalyst comprising platinum applied to the inner wall of the tube and also at least one insert composed of ceramic, having three or four fins pointing from the tube axis to the inner wall of the tube, which is inserted into the cylindrical tube, wherein the fins divide the tube interior space into substantially straight channels with substantially identical circle segment cross sections and wherein the mean gap between the ends of the fins and the inner wall of the tube is in the range of 0.1 to 3 mm. In the method for preparing hydrogen cyanide, (Continued)

ammonia and at least one aliphatic hydrocarbon having 1 to 4 carbon atoms are reacted in the reaction tube at 1000 to 1400° C.

18 Claims, 1 Drawing Sheet

(51) Int. Cl.
    *B01J 35/04* (2006.01)
    *C01C 3/02* (2006.01)
    *B01J 12/00* (2006.01)
    *B01J 19/00* (2006.01)
    *B01J 19/24* (2006.01)

(52) U.S. Cl.
    CPC ....... *B01J 19/0026* (2013.01); *B01J 19/2415* (2013.01); *B01J 21/04* (2013.01); *B01J 35/04* (2013.01); *C01C 3/0229* (2013.01); *B01J 2219/0263* (2013.01); *B01J 2219/30242* (2013.01)

(58) Field of Classification Search
    USPC .................................................. 423/372, 376
    See application file for complete search history.

(56) References Cited

U.S. PATENT DOCUMENTS

| | | |
|---|---|---|
| 4,370,261 A | 1/1983 | Wunder et al. |
| 4,370,492 A | 1/1983 | Wunder et al. |
| 4,440,727 A | 4/1984 | Bruck et al. |
| 4,617,878 A | 10/1986 | Paquet |
| 4,853,190 A | 8/1989 | Manner et al. |
| 4,961,914 A | 10/1990 | Witzel et al. |
| 5,039,643 A | 8/1991 | Hecht et al. |
| 5,097,091 A | 3/1992 | Kremer et al. |
| 5,785,942 A | 7/1998 | von Hippel et al. |
| 6,048,512 A | 4/2000 | von Hippel et al. |
| 6,534,028 B2 | 3/2003 | von Hippel et al. |
| 7,429,370 B2 | 9/2008 | von Hippel et al. |
| 8,114,355 B2 | 2/2012 | Higuchi et al. |
| 2002/0085967 A1 | 7/2002 | Yokota |
| 2003/0175196 A1 | 9/2003 | Blackwell et al. |
| 2005/0131263 A1 | 6/2005 | Wolpert et al. |
| 2005/0232857 A1 | 10/2005 | Lomax et al. |
| 2008/0014342 A1 | 1/2008 | Jakobi et al. |
| 2008/0135223 A1 | 6/2008 | Wolpert et al. |
| 2008/0234527 A1 | 9/2008 | Matsumoto et al. |
| 2010/0284889 A1* | 11/2010 | Boehling ............. B01J 19/0093 423/373 |
| 2012/0141345 A1 | 6/2012 | Slaten |
| 2015/0151273 A1 | 6/2015 | Rizzi et al. |
| 2016/0145114 A1 | 5/2016 | Glöckler et al. |

FOREIGN PATENT DOCUMENTS

| | | |
|---|---|---|
| DE | 29 23 596 | 12/1980 |
| DE | 29 36 844 | 4/1981 |
| DE | 34 20 579 | 2/1985 |
| DE | 41 28 201 | 3/1993 |
| GB | 969796 | 9/1964 |
| JP | 53-030491 | 9/1976 |
| JP | S59-222428 | 12/1984 |
| WO | WO 2004/076351 | 9/2004 |
| WO | WO 2006/050781 | 5/2006 |
| WO | WO 2018/060196 A1 | 4/2018 |

OTHER PUBLICATIONS

Partial English language translation of JP 53-030491 filed Sep. 2, 1976.
Office Action dated Jul. 20, 2017 for copending U.S. Appl. No. 14/896,719.
International Search Report for PCT/EP2014/071119 filed Oct. 2, 2014.
Written Opinion of the International Searching Authority for PCT/EP2014/071119 filed Oct. 2, 2014.
International Preliminary Report on Patentability for PCT/EP2014/071119 filed Oct. 2, 2014.
European Search Report with partial machine translation for EP 13 18 8304 filed Oct. 11, 2013.
U.S. Appl. No. 14/896,719, filed Dec. 8, 2015, US-2016/0145114 A1, May 26, 2016, Glöckler.
Office Action dated Dec. 13, 2017 for copending U.S. Appl. No. 14/896,719.
Response to Office Action dated Dec. 13, 2017 for copending U.S Appl. No. 14/896,719, filed Mar. 13, 2018.
Diefenbach, et al., "HCN SynthesisFrom Methane and Ammonia: Mechanisms of $Pt^+$-Mediated C-N Coupling," *J. Amer. Chem. Soc.* 121:10614-10625 (1999).
Final Office Action for copending U.S. Appl. No. 14/896,719, dated Jul. 12, 2018.
Response to Office Action dated Jul. 20, 2017 for co-pending U.S. Appl. No. 14/896,719, filed Sep. 20, 2017.
Response to Final Office Action for copending U.S. Appl. No. 14/896,719, filed Oct. 12, 2018.
Advisory Action for copending U.S. Appl. No. 14/896,719, dated Oct. 29, 2018.
Appeal Brief for copending U.S. Appl. No. 14/896,719, filed Feb. 10, 2019.
Preliminary Amendment for U.S. Appl. No. 16/337,156 filed on Mar. 27, 2019.
U.S. Appl. No. 16/337,156, filed Mar. 27, 2019, Steurenthaler.

* cited by examiner

REACTION TUBE AND METHOD FOR PRODUCING HYDROGEN CYANIDE

CROSS REFERENCE TO RELATED APPLICATIONS

The present application is US national stage of international application PCT/EP2014/071119, which had an international filing date of Oct. 2, 2014, and which was published in German on Apr. 16, 2015. Priority is claimed to European application EP 13188304.3 filed on Oct. 11, 2013. The contents of the priority application is hereby incorporated by reference in its entirety.

The invention relates to a reaction tube for preparing hydrogen cyanide, and also to a method for preparing hydrogen cyanide using this reaction tube.

The BMA process for preparing hydrogen cyanide from ammonia and an aliphatic hydrocarbon having 1 to 4 carbon atoms is carried out at temperatures in the range of 1000° C. to 1400° C. Since the reaction is endothermic, heat must be supplied to the reaction mixture during the process. On an industrial scale, the BMA process is carried out in externally heated reaction tubes, which have been coated on the tube interior with a catalyst comprising platinum and through which the gaseous reaction mixture is passed. The space-time yield in these industrial reactors is determined by the geometrical surface area of the reaction tube and the active surface area of the platinum-containing catalyst limited thereby.

For reaction tubes used in the BMA process, approaches to increase the surface area/volume ratio of the surface coated with the catalyst or to increase the space-time yield by changing the flow conditions in the reaction tube are known from the prior art.

DE 29 36 844 A1 proposes producing turbulent flow in the reaction tube by internals or random packings, which may be entirely or partially coated with catalyst, in order to improve the space-time yield and the yield of hydrogen cyanide.

WO 90/13405 discloses reaction tubes for the BMA process which have periodic changes in the cross section of the reaction tube from a circular cross section to an elliptical cross section.

DE 41 28 201 describes reaction tubes for the BMA process having internals in the form of coils, which increase the turbulent proportion of the flow of the reaction gases.

However, an aspect common to all these reaction tubes is that soot deposition on the inner surfaces of the reaction tube occurs to an enhanced degree during the preparation of hydrogen cyanide. The soot formed by the decomposition of the aliphatic hydrocarbons used for the preparation of hydrogen cyanide is deposited on the catalyst comprising platinum and thereby inhibits the reaction forming hydrogen cyanide. For this reason, frequent measures must be taken for the removal of soot deposits, for which the preparation of hydrogen cyanide has to be interrupted. In the reaction tubes according to DE 29 36 844 A1, WO 90/13405 and DE 41 28 201, mechanical removal of soot deposits is not practically feasible due to the internals or cross section changes.

Reaction tubes with tubular or rod-shaped internals arranged longitudinally inside the reaction tube are known from DE 1 078 554 and WO 2006/050781. Although the space-time yield and the yield of hydrogen cyanide can be improved with such internals, these internals have considerable disadvantages during long-term operation. On heating to the reaction temperature, tubular and rod-shaped internals may bend, such that they touch the inner wall of the tube. In addition, tubular or rod-shaped internals may be subjected to vibrations or gyratory motions by the flow of the reaction mixture through the tube. This may result in the internals rubbing on the tube inner wall during operation and abrading catalyst from the inner wall of the tube over time, which then leads to greater soot deposition on the inner surface of the reaction tube, starting at the abraded spots. In addition, deformation of the internals produces an uneven flow distribution over the tube cross section, which causes uneven temperature distribution and leads to thermal stresses in the reaction tube, which may cause fracture of the reaction tube during operation.

For this reason, there still exists a need for reaction tubes for the preparation of hydrogen cyanide with which an improved space-time yield and a higher yield of hydrogen cyanide can be achieved, in comparison to the cylindrical tubes used on an industrial scale, and which do not have the disadvantages of the reaction tubes with tubular or rod-shaped internals known from DE 1 078 554 and WO 2006/050781.

It has now been found that this object can be achieved by inserts composed of ceramic which are inserted into the reaction tube, which have fins pointing from the tube axis to the inner wall of the tube.

The invention therefore provides a reaction tube for preparing hydrogen cyanide comprising a cylindrical tube composed of ceramic, and a catalyst comprising platinum applied to the inner wall of the tube, characterized in that the tube has at least one insert composed of ceramic, having three or four fins pointing from the tube axis to the inner wall of the tube, which is inserted into the cylindrical tube, wherein the fins divide the tube interior space into substantially straight channels with substantially identical circle segment cross sections and wherein the mean gap between the ends of the fins and the inner wall of the tube is in the range of 0.1 to 3 mm.

The invention also relates to a method for preparing hydrogen cyanide by reacting ammonia and at least one aliphatic hydrocarbon having 1 to 4 carbon atoms in the presence of a catalyst comprising platinum at a temperature of 1000 to 1400° C., characterized in that the reaction is carried out in a reaction tube according to the invention.

The reaction tube according to the invention comprises a cylindrical tube composed of ceramic, preferably a gas-tight-sintered ceramic and particularly preferably gas-tight-sintered aluminium oxide. The cylindrical tube preferably has an internal diameter of 10 to 50 mm, particularly preferably 15 to 30 mm. The length of the cylindrical tube is preferably in the range of 1000 to 3000 mm and particularly preferably in the range of 1500 to 2500 mm.

The cylindrical tube is entirely or partially coated on the inner side with a catalyst comprising platinum. Preferably more than 80% of the geometric surface area of the inner side of the cylindrical tube is coated with the catalyst comprising platinum. All catalysts known for the BMA process for preparing hydrogen cyanide may be used as catalysts comprising platinum. The catalysts having a reduced tendency for sooting known from WO 2004/076351 are preferably used. The catalysts comprising platinum may be applied to the inner side of the cylindrical tube by all known methods for applying such catalysts to support materials. The methods described in EP-A 0 299 175, EP-A 0 407 809 and EP-A 0 803 430 are preferably used for applying the catalyst comprising platinum to the inner side of the cylindrical tube.

The reaction tube according to the invention has at least one insert composed of ceramic, having three or four fins pointing from the tube axis to the inner wall of the tube, which is inserted into the cylindrical tube. The insert is preferably composed of sintered aluminium oxide. The fins of the insert divide the tube interior space into substantially straight channels with substantially identical circle segment cross sections. For this purpose the fins are shaped as essentially closed surfaces aligned in the longitudinal direction of the tube. They may, however, have discrete openings or notches at the ends for pressure equalization between neighbouring channels. The fins of the insert may be positioned on a rod or tube extending along the axis of the tube. However, the fins of the insert preferably extend as far as the tube axis and meet one another at the tube axis. The mean gap between the ends of the fins and the inner wall of the tube is in the range of 0.1 to 3 mm. The ends of the fins are preferably rounded. The mean gap then relates to that point at which the rounding of the fin comes closest to the inner wall of the tube.

The insert of the reaction tube according to the invention may be produced in the same manner as the cylindrical tube by extruding a plastic material comprising aluminium oxide and subsequent drying and calcination.

The insert of the reaction tube according to the invention has the advantage that it is not so greatly deformed on heating to the temperature required for preparing hydrogen cyanide by the BMA process, by reason of its geometry, as the tubular or rod-shaped internals known from the prior art. Also, by reason of its geometry and the small gap between the ends of the fins and the inner wall of the tube, it is less likely to undergo vibrations or gyratory motions induced by gas flowing through the reaction tube than the rod-shaped or tubular internals known from the prior art. This ensures that abrasion of catalyst from the inner wall of the tube does not occur when using the reaction tube for preparing hydrogen cyanide by the BMA process. Abrasion of the catalyst from the inner wall of the tube can also be avoided by rounded ends of the fins. The geometry of the insert and the small gap between the ends of the fins and the inner wall of the tube also ensures that the channels formed between the fins maintain the same cross section while using the reaction tube for preparing hydrogen cyanide, such that the flow distribution remains uniform in the channels and thermal stresses due to an assymetrical temperature distribution along the circumference of the tube are avoided.

In a preferred embodiment, the fins make contact with the inner wall of the tube at discrete points. A subdivision of the tube interior space into channels with substantially identical cross sections is thereby achieved, even without means of centering or spacers, and the insert can be more rapidly and easily installed in the cylindrical tube than the rod-shaped or tubular internals known from the prior art.

The fins of the insert preferably have a mean thickness which is 0.25 to 2.5 times the mean thickness of the wall of the cylindrical tube. The mean thickness of the fins is particularly preferably 0.5 to 2 times, particularly 0.75 to 1.5 times the mean thickness of the wall of the cylindrical tube. Most preferably, the fins of the insert have the same thickness as the wall of the cylindrical tube. By choosing a wall thickness in these ranges, good mechanical stability of the insert is achieved at low weight.

The insert is preferably entirely or partially coated with a catalyst comprising platinum, particularly preferably with the same catalyst as the cylindrical tube. Particular preference is given to entirely coating the insert with catalyst. To coat the insert with the catalyst comprising platinum, the same methods can be used as for coating the cylindrical tube. By coating the insert with a catalyst comprising platinum, a higher space-time yield can be achieved when using the reaction tube for preparing hydrogen cyanide by the BMA process.

The reaction tube according to the invention may have one or more inserts inserted into the cylindrical tube. Preferably, only one insert is inserted into the cylindrical tube. Particularly preferably, one insert is arranged in a central region of the cylindrical tube and has a length of 10 to 90%, particularly 40 to 75% of the length of the cylindrical tube. The use of only a single insert enables mechanical removal of soot from the reaction tube, even in the region of the channels formed between the fins of the insert. The arrangement of an insert, having a shorter length than the reaction tube, in a central region of the reaction tube, leads to a higher space-time yield compared to an arrangement at the beginning or at the end of the reaction tube.

The reaction tube according to the invention can be used to prepare hydrogen cyanide, preferably to prepare hydrogen cyanide by the BMA process.

In the method according to the invention for preparing hydrogen cyanide, a gas mixture comprising ammonia and at least one aliphatic hydrocarbon having 1 to 4 carbon atoms is passed through the reaction tube according to the invention and the reaction tube is maintained at a temperature of 1000° C. to 1400° C. by external heating. The hydrocarbons are preferably composed of at least 90 vol % methane. The gas mixture used for preparing hydrogen cyanide preferably comprises ammonia in stoichiometric excess. When using methane as hydrocarbon, a molar ratio of ammonia to methane in the range of 1.01:1 to 1.30:1 is preferably used. The flow rate of the gas mixture through the reaction tube is preferably selected such that a substantially laminar flow develops along the entire reaction tube including the region in which inserts are arranged.

With the method according to the invention, a higher yield of hydrogen cyanide can be achieved with respect to hydrocarbon used and with respect to ammonia used, and also a higher space-time yield, than by using a reaction tube without internals. In the method according to the invention, the high and improved yield of hydrogen cyanide can be maintained over a longer period of operation in contrast to the rod-shaped or tubular internals known from the prior art.

FIG. 1 shows an insert composed of ceramic with four fins in perspective view.

FIG. 2 shows a cross section through a reaction tube with an insert composed of ceramic having four fins, pointing from the tube axis towards the inner wall of the tube and which are rounded at the ends.

FIG. 3 shows a cross section through a reaction tube with an insert composed of ceramic having three fins, pointing from the tube axis towards the inner wall of the tube and which are rounded at the ends.

Figure 1:
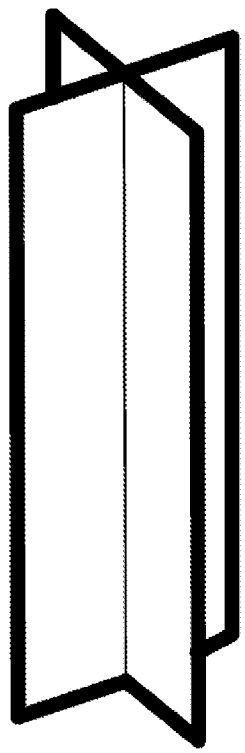
FIGS. 1 to 3 show embodiments of the insert and arrangement thereof in the cylindrical tube of the reaction tube according to the invention.
Figure 2:
Figure 3:

The insert shown in FIG. 1 may be inserted into the cylindrical tube to provide a cross section as shown in FIG. 2 along the entire length of the insert, i.e. the gap between the ends of the fins and the inner wall of the tube is the same along the entire length of the insert. On the other hand, the insert shown in FIG. 1 may be inserted into the cylindrical tube to provide a cross section as shown in FIG. 2 only at the middle of the insert, whereas at the ends the insert makes contact with the inner wall of the tube through one or two of the fins, as long as the mean gap between the ends of the fins and the inner wall of the tube is in the range of 0.1 to 3 mm. For example, this is the case if the cross section corresponds to FIG. 2 at the middle of the insert with a gap between the fins and the inner wall of the tube of 1 mm, whereas at the upper end of the insert the fins shown in FIG. 2 on the top and left side make contact with the inner wall of the tube and at the lower end of the insert the fins shown in FIG. 2 on the bottom and right side make contact with the inner wall of the tube.

EXAMPLES

Example 1 (Comparative Example with Empty Tube)

A cylindrical reaction tube composed of sintered aluminium oxide of length 2100 mm and internal diameter 17 mm was coated with a platinum-containing catalyst and formed as described in example 6 of EP 0 407 809 A. A gas mixture composed of 44 mol/h ammonia and 40 mol/h methane was then passed from below through the vertically oriented reaction tube at 1280° C. The gas exiting from the reaction tube was analyzed; the yield of hydrogen cyanide was 79.9% based on ammonia and 88.8% based on methane.

Example 2 (Comparative Example with Insert According to WO 2006/050781)

Example 1 was repeated, however a tube composed of sintered aluminium oxide of length 1200 m and external diameter 6 mm, coated with catalyst on the exterior, was arranged centrally in the reaction tube and the gas mixture was passed through the annular gap between the tubes. The yield of hydrogen cyanide was 84.4% based on ammonia and 93.3% based on methane.

Example 3

Example 1 was repeated, however an insert composed of sintered aluminium oxide coated with catalyst, having four rounded fins corresponding to FIG. 1, was inserted into the cylindrical tube. The insert had a length of 1200 mm, a mean wall thickness of the fins of 2.8 mm and a mean gap between the ends of the fins and the inner wall of the tube of 0.5 mm. The yield of hydrogen cyanide was 88.7% based on ammonia and 98.1% based on methane.

Example 4

Example 3 was repeated, however an insert having a length of 1800 mm was used. The yield of hydrogen cyanide was 90.8% based on ammonia and 99.6% based on methane.

Example 5

Example 3 was repeated, however an insert having a length of 600 mm was used. The yield of hydrogen cyanide was 81.9% based on ammonia and 92.6% based on methane.

The examples show that higher yields of hydrogen cyanide with respect to hydrocarbon used and with respect to ammonia used and also a higher space-time yield are achieved with the reaction tube according to the invention in preparing hydrogen cyanide by the BMA process than by using a reaction tube without internals. Better yields are also achieved with the same length of insert than by using a reaction tube with rod-shaped or tubular internals corresponding to the prior art.

The invention claimed is:

1. A reaction tube for preparing hydrogen cyanide, comprising a cylindrical tube composed of ceramic and a catalyst comprising platinum applied to the inner wall of the tube, wherein at least one insert composed of ceramic is inserted into the cylindrical tube, said insert having three or four fins pointing from the tube axis to the inner wall of the tube, dividing the tube interior space into substantially straight channels with substantially identical circle segment cross sections and wherein the mean distance between the ends of the fins and the inner wall of the tube is in the range of from 0.5 to 3 mm and wherein the reaction tube has an internal diameter of 15 to 30 mm.

2. The reaction tube of claim 1, wherein the cylindrical tube is composed of tightly sintered aluminium oxide.

3. The reaction tube of claim 1, wherein the insert is composed of sintered aluminium oxide.

4. The reaction tube of claim 1, wherein the insert is coated with a catalyst comprising platinum.

5. The reaction tube of claim 1, wherein the ends of the fins are rounded.

6. The reaction tube of claim 1, wherein the fins have a mean thickness which is 0.25 to 2.5 times the mean thickness of the wall of the cylindrical reaction tube.

7. The reaction tube of claim 1, wherein said tube has exactly one insert inserted into the cylindrical tube.

8. The reaction tube of claim 7, wherein the insert is arranged in a central region of the cylindrical tube and has a length of 10 to 90% of the length of the cylindrical tube.

9. The reaction tube of claim 1, wherein the cylindrical tube is composed of tightly sintered aluminium oxide, the insert is composed of sintered aluminium oxide and coated with a catalyst comprising platinum, and the ends of the fins are rounded.

10. The reaction tube of claim 9, wherein said tube has exactly one insert inserted into the cylindrical tube.

11. The reaction tube of claim 10, wherein the insert is arranged in a central region of the cylindrical tube and has a length of 10 to 90% of the length of the cylindrical tube.

12. The reaction tube of claim 9, wherein the fins have the same thickness as the wall of the cylindrical tube.

13. The reaction tube of claim 12, wherein said tube has exactly one insert inserted into the cylindrical tube, having a length of 10 to 90% of the length of the cylindrical tube.

14. A method for preparing hydrogen cyanide by reacting ammonia and at least one aliphatic hydrocarbon having 1 to 4 carbon atoms in the presence of a catalyst comprising platinum at a temperature of 1000 to 1400° C., wherein the reaction is carried out in at least one reaction tube, and wherein said reaction tube comprises a cylindrical tube composed of ceramic and a catalyst comprising platinum applied to the inner wall of the tube, wherein at least one insert composed of ceramic is inserted into the cylindrical tube, said insert having three or four fins pointing from the tube axis to the inner wall of the tube, dividing the tube interior space into substantially straight channels with substantially identical circle segment cross sections and wherein the mean distance between the ends of the fins and the inner wall of the tube is in the range of from 0.5 to 3 mm and wherein the reaction tube has an internal diameter of 15 to 30 mm.

15. The method of claim 14, wherein the hydrocarbons are composed of at least 90 vol % of methane.

16. The method of claim 14, wherein said cylindrical tube is composed of tightly sintered aluminium oxide, the insert is composed of sintered aluminium oxide and coated with a catalyst comprising platinum, and the ends of the fins are rounded.

17. The method of claim 16, wherein there is exactly one insert inserted into the cylindrical tube and the insert is arranged in a central region of the cylindrical tube and has a length of 10 to 90% of the length of the cylindrical tube.

18. The method of claim 16, wherein the fins of said insert have the same thickness as the wall of the cylindrical tube and there is exactly one insert inserted into the cylindrical tube, having a length of 10 to 90% of the length of the cylindrical tube.

* * * * *